(12) United States Patent
Hattori

(10) Patent No.: US 11,215,808 B2
(45) Date of Patent: Jan. 4, 2022

(54) MICROSCOPE PARAMETER SETTING METHOD AND OBSERVATION METHOD RECOGNIZING THE SHAPE OF A CELL

(71) Applicant: OLYMPUS CORPORATION, Hachioji (JP)

(72) Inventor: Toshiyuki Hattori, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 286 days.

(21) Appl. No.: 15/844,419

(22) Filed: Dec. 15, 2017

(65) Prior Publication Data

US 2018/0188520 A1 Jul. 5, 2018

(30) Foreign Application Priority Data

Jan. 5, 2017 (JP) .............................. JP2017-000441

(51) Int. Cl.
*G02B 21/24* (2006.01)
*G02B 21/36* (2006.01)
(Continued)

(52) U.S. Cl.
CPC ........... *G02B 21/367* (2013.01); *G02B 21/06* (2013.01); *G02B 21/244* (2013.01); *G06K 9/00134* (2013.01); *G06K 9/3216* (2013.01); *G06T 7/0012* (2013.01); *G06T 7/50* (2017.01); *G06T 11/40* (2013.01); *G06T 2207/10056* (2013.01); *G06T 2207/10064* (2013.01); *G06T 2207/30024* (2013.01); *G06T 2210/41* (2013.01)

(58) Field of Classification Search
CPC . G02B 21/244; G02B 21/365; G06K 9/00134
See application file for complete search history.

(56) References Cited

U.S. PATENT DOCUMENTS

2005/0012992 A1\* 1/2005 Kitajima ............ G02B 21/0012
359/381
2007/0229946 A1 10/2007 Okada et al.
(Continued)

FOREIGN PATENT DOCUMENTS

EP 1840558 A1 10/2007
EP 2270198 A1 1/2011
(Continued)

OTHER PUBLICATIONS

Japanese Office Action (and English language translation thereof) dated Oct. 6, 2020 issued in Japanese Application No. 2017-000441.

*Primary Examiner* — Y Lee
(74) *Attorney, Agent, or Firm* — Holtz, Holtz & Volek PC

(57) ABSTRACT

Provided is a microscope parameter setting method including step of setting a focal point position relative to a specimen, step of adjusting a microscope parameter, step of acquiring an image of the specimen at the set focal point position, step of recognizing the shape of an observation object, steps of displaying the recognized shape of the observation object such that the recognized shape is superimposed on the image, step of determining whether or not the microscope parameter is appropriate, and step of storing the microscope parameter that has been determined to be appropriate, such that the microscope parameter is associated with the focal point position.

2 Claims, 6 Drawing Sheets

(51) Int. Cl.
*G06T 11/40* (2006.01)
*G06T 7/50* (2017.01)
*G06T 7/00* (2017.01)
*G02B 21/06* (2006.01)
*G06K 9/32* (2006.01)
*G06K 9/00* (2006.01)

(56) References Cited

U.S. PATENT DOCUMENTS

| | | |
|---|---|---|
| 2008/0251689 A1 | 10/2008 | Yamashita et al. |
| 2011/0013821 A1 | 1/2011 | Mimura et al. |
| 2011/0216183 A1 | 9/2011 | Yokomachi |
| 2014/0233094 A1 | 8/2014 | Ue et al. |
| 2015/0241685 A1* | 8/2015 | Saur .................. G02B 21/0012 348/79 |
| 2017/0350805 A1 | 12/2017 | Murata et al. |

FOREIGN PATENT DOCUMENTS

| | | |
|---|---|---|
| EP | 2363740 A1 | 9/2011 |
| EP | 2770360 A2 | 8/2014 |
| EP | 3239287 A1 | 11/2017 |
| JP | 2007263730 A | 10/2007 |
| JP | 2008261769 A | 10/2008 |
| JP | 2008292722 A | 12/2008 |
| JP | 2009229276 A | 10/2009 |
| JP | 2011180538 A | 9/2011 |
| JP | 2014160213 A | 9/2014 |
| WO | 2016103501 A1 | 6/2016 |

\* cited by examiner

MICROSCOPE PARAMETER SETTING METHOD AND OBSERVATION METHOD RECOGNIZING THE SHAPE OF A CELL

CROSS-REFERENCE TO RELATED APPLICATIONS

This application is based on Japanese Patent Application No. 2017-000441, the contents of which are incorporated herein by reference.

TECHNICAL FIELD

The present invention relates to a microscope parameter setting method and an observation method.

BACKGROUND ART

Scattering from a fluorescent sample has conventionally caused a problem that a fluorescent image based on fluorescence generated at a deep position of the sample is darker than a fluorescent image based on fluorescence generated at a shallow position of the sample. As a solution for this problem, a scanning type microscope is known in which a microscope parameter of at least a light source, a scanning unit, or a fluorescence detecting unit is adjusted such that the brightness conditions of acquired fluorescent images are substantially the same at each of the depths of excitation-light convergence positions (for example, see PTL 1).

CITATION LIST

Patent Literature

{PTL 1}
Japanese Unexamined Patent Application, Publication No. 2008-292722

SUMMARY OF INVENTION

One aspect of the present invention provides a microscope parameter setting method including a step of setting a focal point position relative to a specimen, a step of adjusting a microscope parameter, a step of acquiring an image of the specimen at the set focal point position by use of the adjusted microscope parameter, a step of recognizing the shape of an observation object in the acquired image, a step of displaying the recognized shape of the observation object such that the recognized shape is superimposed on the image, a step of determining whether or not the microscope parameter is appropriate, by referring to the image and the shape of the observation object which are superimposingly displayed, and a step of storing the microscope parameter that has been determined to be appropriate, such that the microscope parameter is associated with the focal point position.

Another aspect of the present invention provides an observation method including a step of setting a focal point position relative to a specimen, a step of adjusting a microscope parameter, a step of acquiring an image of the specimen at the set focal point position by use of the adjusted microscope parameter, a step of recognizing the shape of an observation object in the acquired image, a step of displaying the recognized shape of the observation object such that the recognized shape is superimposed on the image, a step of determining whether or not the microscope parameter is appropriate, by referring to the image and the shape of the observation object which are superimposingly displayed, a step of storing the microscope parameter that has been determined to be appropriate, such that the microscope parameter is associated with the focal point position, a step of acquiring an image for observation by use of the microscope parameter stored in association with the focal point position, and a step of performing quantitative analysis based on the acquired image for observation.

DESCRIPTION OF EMBODIMENTS

Hereinafter, a description is given of a microscope parameter setting method and an observation method according to one embodiment of the present invention, with reference to the drawings.

Figure 1:
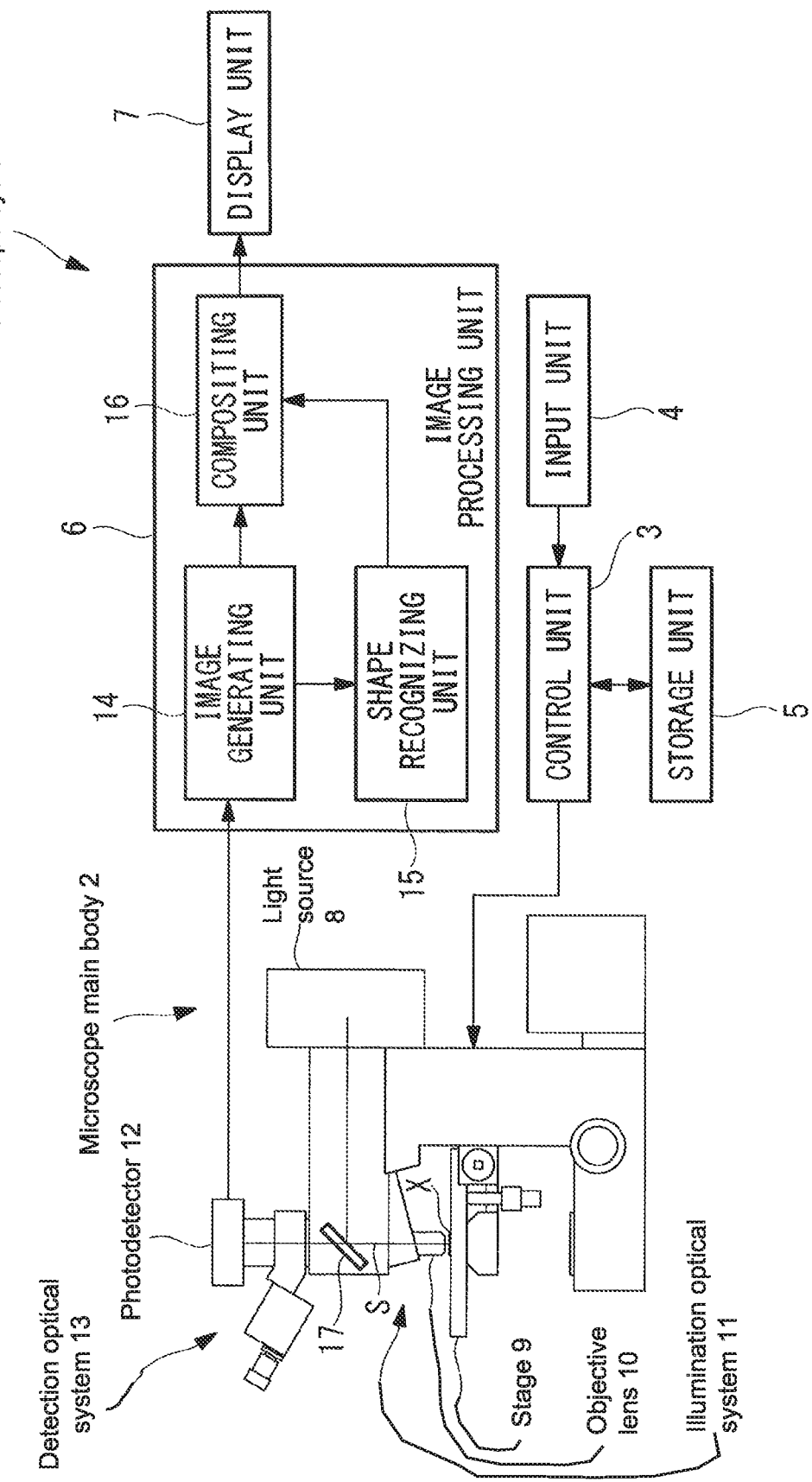
FIG. 1 is a block diagram illustrating a microscope system that carries out a microscope parameter setting method according to one embodiment of the present invention.

The microscope parameter setting method according to the present embodiment is carried out by a microscope system 1 illustrated in FIG. 1.

The microscope system 1 includes a microscope main body 2, a control unit 3 that controls the microscope main body 2, an input unit 4 through which an operator performs input to the control unit 3, a storage unit 5 connected to the control unit 3, an image processing unit 6 that processes an image acquired by the microscope main body 2, and a display unit 7 that displays the image processed by the image processing unit 6.

The microscope main body 2 includes a light source 8 that emits illumination light, a stage 9 on which a specimen X is placed so as to be three-dimensionally moved, an illumination optical system 11 including an objective lens 10 that converges light from the light source 8 onto the specimen X, and a detection optical system 13 including a photodetector 12 that detects light which has generated at the specimen X and has been converged by the objective lens 10. In FIG. 1, reference numeral 17 denotes a dichroic mirror that reflects illumination light from the light source 8 toward the specimen X and that transmits light from the specimen X therethrough.

The image processing unit 6 includes an image generating unit 14 that generates a live image (an image) on the basis of intensity information about light detected by the photodetector 12, a shape recognizing unit 15 that recognizes the shape of an observation object by analyzing the live image generated by the image generating unit 14, and a compositing unit 16 that generates a composite image in which the shape of the observation object recognized by the shape recognizing unit 15 is superimposed on the live image generated by the image generating unit 14.

For example, when a biological tissue is adopted as the specimen X, observation objects may be cell nuclei and the number of the cell nuclei may be counted in quantitative analysis.

In this case, the shape recognizing unit 15 recognizes the shapes of the cell nuclei by analyzing a live image, and the compositing unit 16 generates a composite image in which the recognized shapes of the nuclei are superimposed on the live image.

The input unit 4 is configured to receive an input as to a three-dimensional position of image acquisition from an operator, and further, to receive an input for adjusting, as a microscope parameter required for observation, at least one of the intensity of illumination light generated from the light source 8 and setting values of the illumination optical system 11 and the detection optical system 13. In addition, the input unit 4 is configured to receive an input as to whether or not a microscope parameter is appropriate by reference to the composite image displayed on the display unit 7. Alternatively, as the microscope parameter, a correction collar of the objective lens 10 may be adopted. In this case, since the refractive index of the specimen X differs from the refractive index of a liquid immersion medium of the objective lens 10, the generation amount of spherical aberration varies depending on an observation depth in the specimen X. Accordingly, adjustment according to an observation depth can be preferably carried out.

In a microscope parameter setting mode, examples of a three-dimensional position of image acquisition inputted through the input unit 4 include a predetermined horizontally two-dimensional observation range and include a plurality of focal point positions spaced from one another in the vertical direction with respect to the observation range, that is, the optical axis S direction of the objective lens 10.

In an observation mode, examples of a three-dimensional position of image acquisition inputted through the input unit 4 include a predetermined horizontally two-dimensional observation range and a shift amount, in the vertical direction, of a focal point position for photographing of the observation range.

The control unit 3 is configured to control the microscope main body 2 on the basis of the position of image acquisition set by the input unit 4 and the adjusted microscope parameter. In addition, the control unit 3 is configured to, when the input unit 4 receives an input indicating that the microscope parameter is appropriate, store, in the storage unit 5, the position of image acquisition for which the microscope parameter is set, particularly, the focal point position of illumination light and the microscope parameter, such that the position and the microscope parameter are associated with each other.

In the observation mode, the control unit 3 is configured to read out, from the storage unit 5, microscope parameters stored in association with the corresponding focal point positions, and thereby to automatically set a microscope parameter for each of the focal point positions. For focal point positions stored in the storage unit 5, the corresponding microscope parameters stored in association with the focal point positions are set. For focal point positions not stored in the storage unit 5, microscope parameters are set by interpolation of stored microscope parameters.

A description is given below of a microscope parameter setting method according to the present embodiment using the microscope system 1 having the above configuration.

Figure 2:
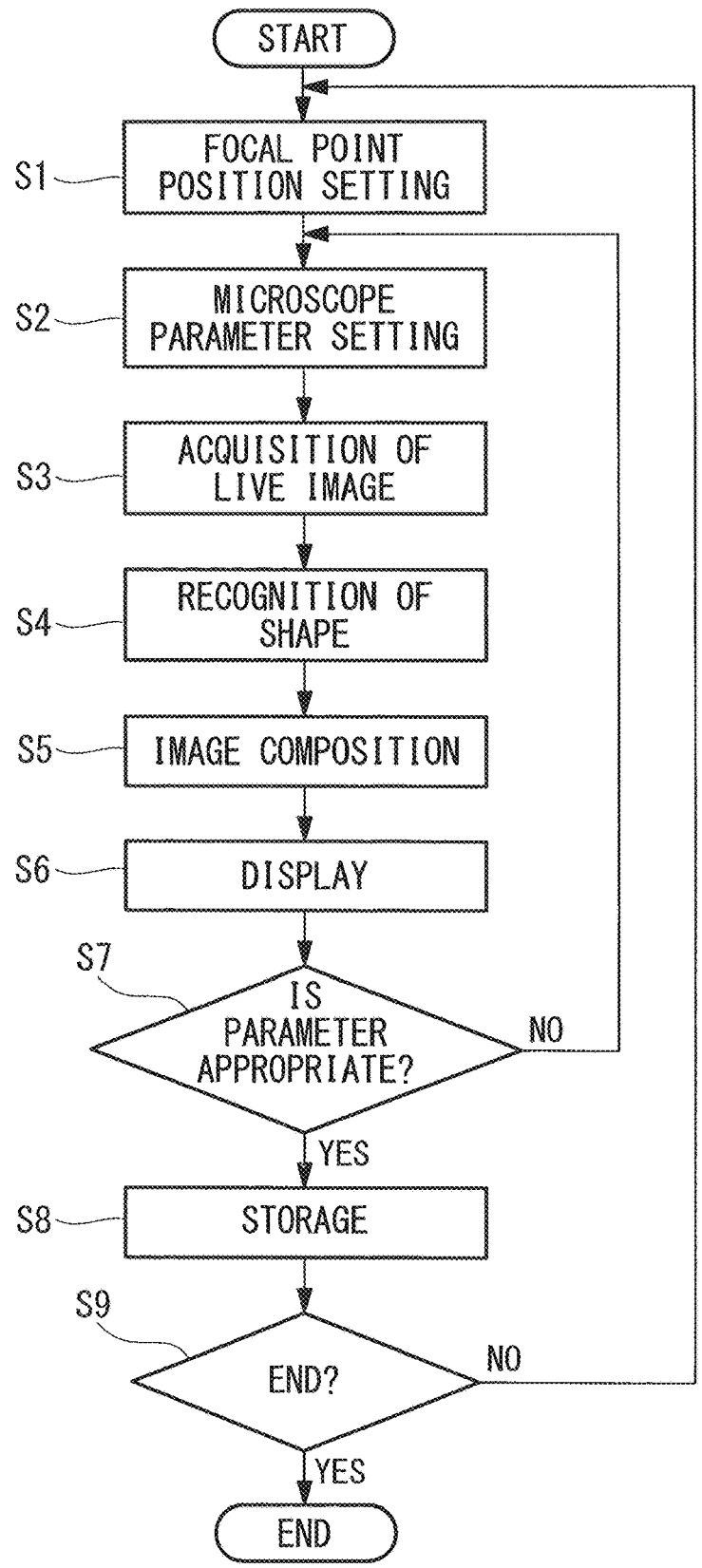
FIG. 2 is a flowchart showing the microscope parameter setting method of FIG. 1.

In order to set a microscope parameter, after the control unit 3 is caused to operate in a microscope parameter setting mode, an operator first sets, through the input unit 4, a focal point position of the objective lens 10 for which a microscope parameter is to be set (step S1), and a microscope parameter for the focal point position is set while being adjusted, as appropriate (step S2), as shown in FIG. 2. Further, the operator sets a horizontal image acquisition range through the input unit 4.

The control unit 3 operates the illumination optical system 11 and the stage 9 according to the set focal point position and the set image acquisition range, and acquires a live image by controlling the light source 8, the illumination optical system 11, and the detection optical system 13 according to the adjusted microscope parameter (step S3).

The acquired live image is sent to the image processing unit 6, the shape recognizing unit 15 recognizes the shapes of cell nuclei (step S4), and the compositing unit 16 generates a composite image in which the recognized shapes are superimposed on the live image (step S5). The generated composite image is displayed on the display unit 7 (step S6).

Figure 3:
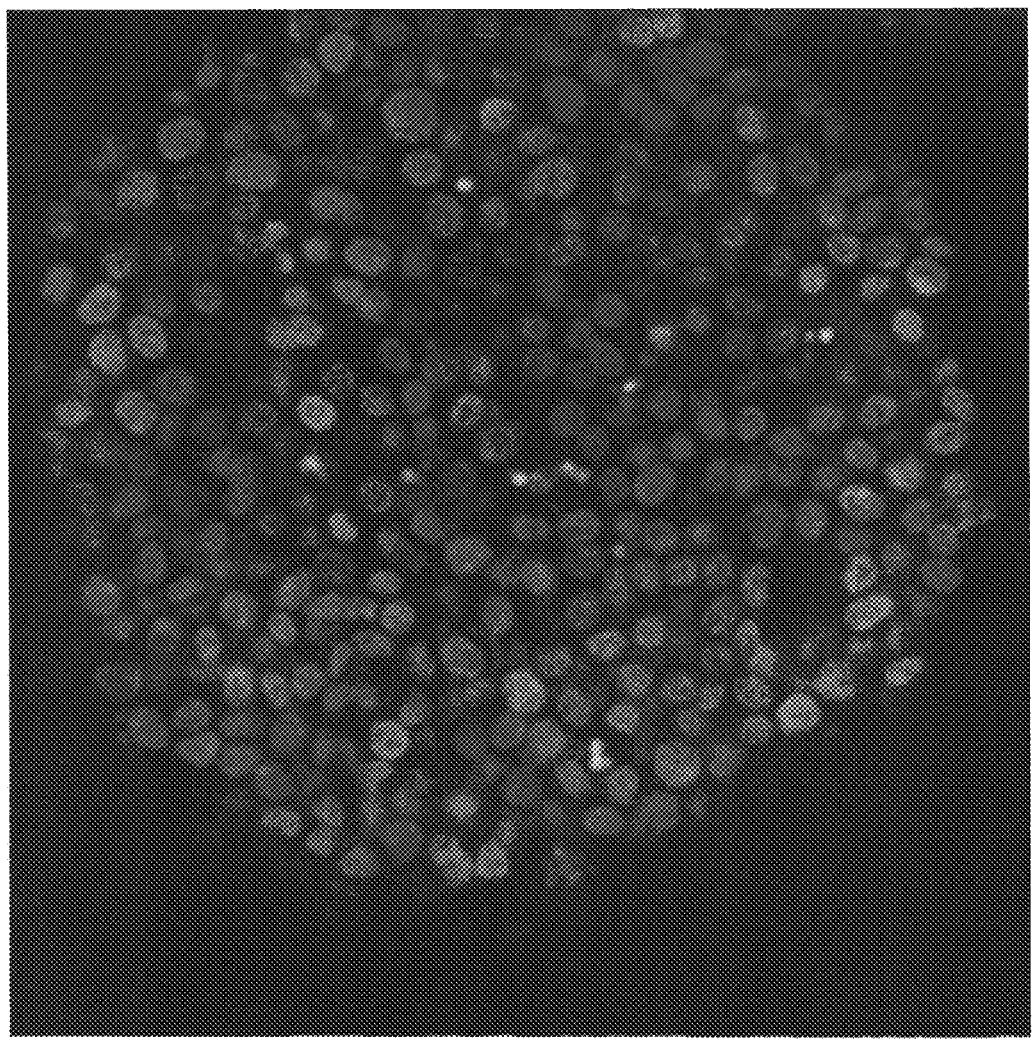
FIG. 3 shows an example of a bright live image acquired by one microscope parameter being set therefor.
Figure 4:
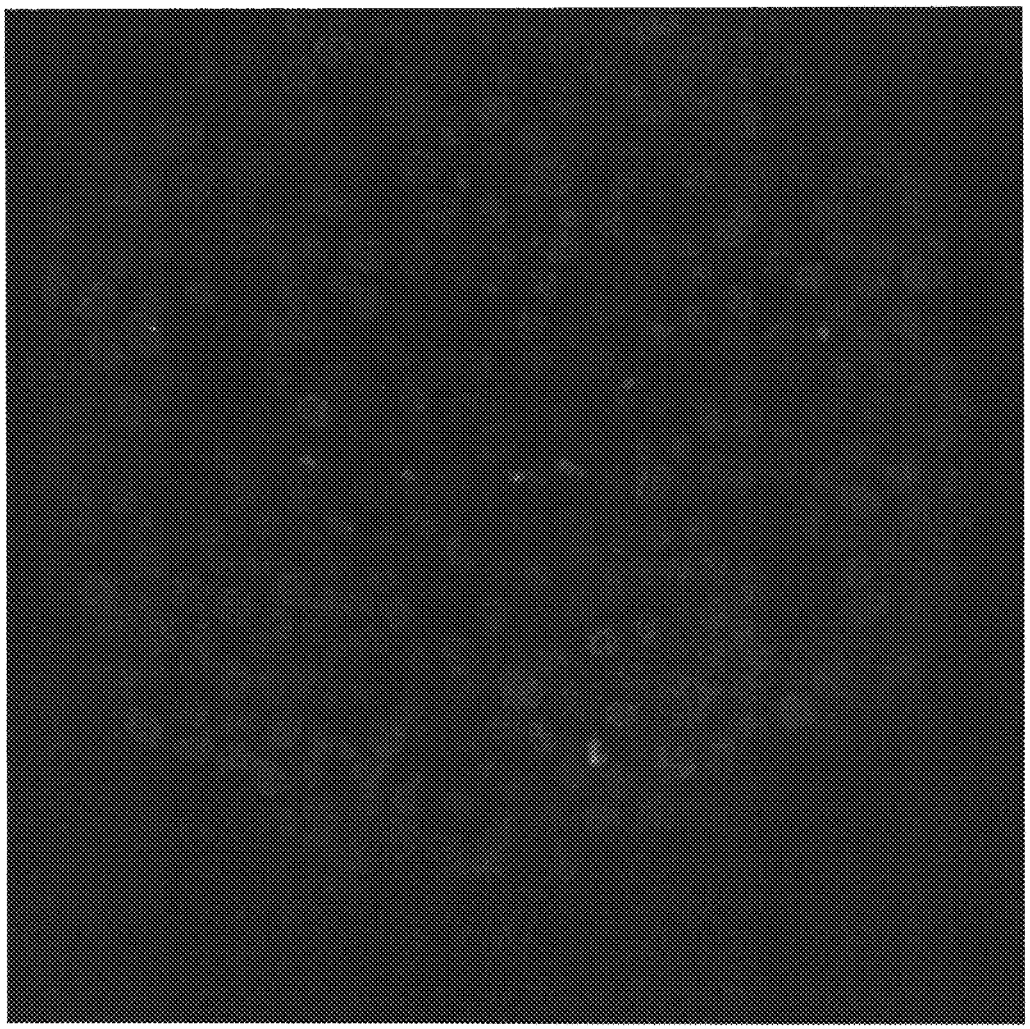
FIG. 4 shows an example of a dark live image acquired by another microscope parameter being set therefor.

The operator determines whether or not the microscope parameter is appropriate for recognition of the shapes of cell nuclei, by checking the composite image displayed on the display unit 7 (step S7). For example, FIGS. 3 and 4 show examples of live images which are acquired by use of different microscope parameters. When these live images are compared with each other, the bright live image shown in FIG. 3 seems to be more appropriate for quantitative analysis than the dark live image shown in FIG. 4 at first glance.

Figure 5:
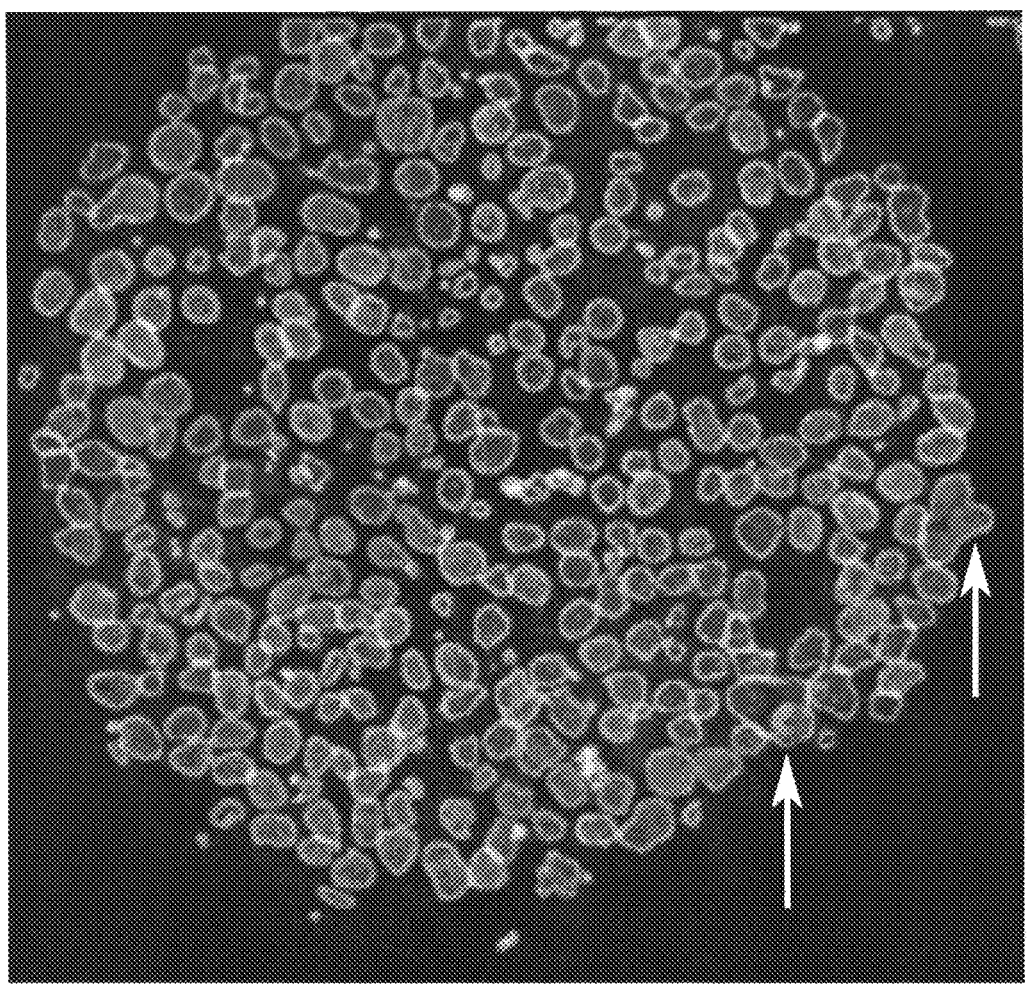
FIG. 5 shows an example of a composite image obtained by superimposing, on the live image in FIG. 3, the result of shape recognition of the live image.
Figure 6:
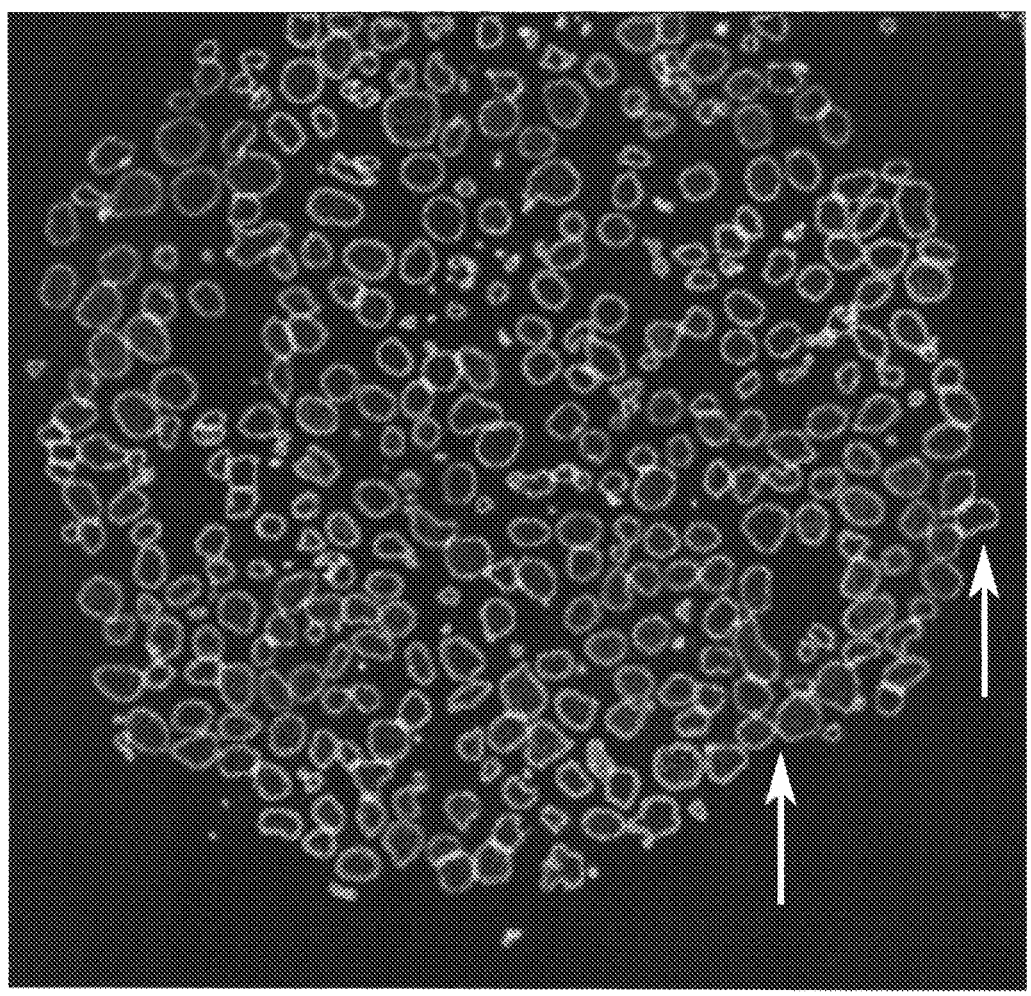
FIG. 6 shows an example of a composite image obtained by superimposing, on the live image in FIG. 4, the result of shape recognition of the live image.

However, as shown in FIGS. 5 and 6, when respective composite images obtained by superimposing, on the live images in FIGS. 3 and 4, the results of recognition of the shapes of cell nuclei by reference to respective live images are compared with each other, the shapes of nuclei in the bright live image are recognized as if some of the nuclei were a single nucleus, as indicated by arrows in FIG. 5. In contrast, the shapes of all the nuclei in the relative dark live image are separately recognized, as indicated by arrows in FIG. 6. As a result, the microscope parameter used for acquisition of the live image in FIG. 4 can be easily determined to be more appropriate for precision quantitative analysis.

When the microscope parameter is determined to be inappropriate as a result of determination at step S7, steps S2 and later are repeated.

When the microscope parameter is determined to be appropriate as a result of determination at step S7, the microscope parameter and the focal point position are stored in the storage unit 5 so as to be associated with each other (step S8).

Whether or not to set a microscope parameter for another focal point position is determined (step S9). When a microscope parameter is determined to be set, steps S1 and later are repeated. When a microscope parameter is determined not to be set, the process is ended.

By the microscope parameter setting method according to the present embodiment, a process of recognizing the shapes of cell nuclei, which are observation objects, from an acquired live image is carried out, and the result of recognition is displayed so as to be superimposed on the live image. Accordingly, an operator can make not sensuous determination but objective determination as to whether or not a microscope parameter is appropriate, whereby an advantageous that a microscope parameter which allows precision quantitative analysis can be easily set is offered.

By the observation method according to the present embodiment, an image for observation can be acquired in the observation mode by use of an appropriate microscope parameter set at each of a plurality of focal point positions in the above way, and precision quantitative analysis using the acquired image for observation can be performed. Accordingly, an appropriate microscope parameter is set before an image for observation is acquired for quantitative analysis. Consequently, occurrence of a problem such as the necessity to reacquire an image for observation because a microscope parameter has turned out to be inappropriate after an image for observation is acquired, can be prevented in advance.

In the present embodiment, observation parameters are calculated by interpolation of microscope parameters corresponding to all the focal point positions on the basis of association between the microscope parameters and multiple focal point positions which have been acquired and stored in the microscope parameter setting mode, so that an image for observation is acquired and quantitative analysis is performed by reference to the acquired image. Alternatively, when a microscope parameter is determined to be appropriate in the microscope parameter setting mode, a live image used for setting is also stored so as to be associated with a corresponding focal point position, and acquisition of an image at the stored focal point position may be omitted at a time of image acquisition for quantitative analysis.

Consequently, a time required to acquire an image can be shortened and a result of quantitative analysis can be speedily obtained. Further, irradiation of the specimen X with illumination light is reduced so that damage given to the specimen X can be reduced.

In the present embodiment, cell nuclei of a biological tissue are used as examples of an observation object. Alternatively, any other arbitrary observation object may be used in quantitative analysis.

In addition, the microscope observation method is not limited to observation of fluorescence, and is applicable to a method for any other arbitrary observation.

From the above-described embodiments and modifications thereof, the following aspects of the invention are derived.

One aspect of the present invention provides a microscope parameter setting method including a step of setting a focal point position relative to a specimen, a step of adjusting a microscope parameter, a step of acquiring an image of the specimen at the set focal point position by use of the adjusted microscope parameter, a step of recognizing the shape of an observation object in the acquired image, a step of displaying the recognized shape of the observation object such that the recognized shape is superimposed on the image, a step of determining whether or not the microscope parameter is appropriate, by referring to the image and the shape of the observation object which are superimposingly displayed, and a step of storing the microscope parameter that has been determined to be appropriate, such that the microscope parameter is associated with the focal point position.

According to the present aspect, with the focal point position set relative to the specimen and with the microscope parameter adjusted, an image of the specimen at the set focal point position is acquired by use of the adjusted microscope parameter. The shape of an observation object in the acquired image is recognized, and the recognized shape is displayed so as to be superimposed on the acquired image. By reference to this, whether or not the acquired image is an appropriate image in which the shape of the observation object is precisely recognizable is determined. When the image is determined to be an appropriate image, the microscope parameter with which the image has been acquired and the focal point position at which the image has been acquired are stored so as to be associated with each other. Accordingly, when images are acquired for the following quantitative analysis, such images are acquired by use of microscope parameters stored in association with each corresponding focal point position, whereby precise quantitative analysis can be performed.

The above aspect may further include a step of, when the microscope parameter is determined to be appropriate, storing the image based on which the determination is made, such that the image is associated with the focal point position.

By this method, at a time when a microscope parameter is determined to be appropriate, an appropriate image based on which the determination is made has been already acquired. Consequently, time and effort for reacquiring an image for quantitative analysis are omitted so that a time required for the quantitative analysis can be shortened.

Another aspect of the present invention provides an observation method including a step of setting a focal point position relative to a specimen, a step of adjusting a microscope parameter, a step of acquiring an image of the specimen at the set focal point position by use of the adjusted microscope parameter, a step of recognizing the shape of an observation object in the acquired image, a step of displaying the recognized shape of the observation object such that the recognized shape is superimposed on the image, a step of determining whether or not the microscope parameter is appropriate, by referring to the image and the shape of the observation object which are superimposingly displayed, a step of storing the microscope parameter that has been determined to be appropriate, such that the microscope parameter is associated with the focal point position, a step of acquiring an image for observation by use of the microscope parameter stored in association with the focal point position, and a step of performing quantitative analysis based on the acquired image for observation.

According to the present aspect, with the focal point position set relative to the specimen and with the microscope parameter adjusted, an image of the specimen at the set focal point position is acquired by use of the adjusted microscope parameter. The shape of an observation object in the acquired image is recognized, and the recognized shape is displayed such that the recognized shape is superimposed on the acquired image. By reference to this, whether or not the acquired image is an appropriate image in which the shape of the observation object is precisely recognizable is determined. When the image is determined to be an appropriate image, the microscope parameter with which the image has been acquired and the focal point position at which the image has been acquired are stored so as to be associated with each other.

Quantitative analysis is performed on the basis of an image for observation acquired by use of a stored microscope parameter. Consequently, an appropriate microscope parameter is set before an image for observation is acquired for quantitative analysis. Thus, occurrence of a problem such as the necessity to reacquire an image for observation because the microscope parameter has turned out to be inappropriate after an image for observation is acquired, can be prevented in advance.

REFERENCE SIGNS LIST

S1, S3, S4, S5, S6, S7, S8 step
X specimen

The invention claimed is:
1. A microscope parameter setting method comprising:
(a) setting a focal point position relative to a specimen, the specimen being a biological tissue;
(b) adjusting a microscope parameter;

(c) acquiring, based on light intensity detected with a photodetector, a digital live image of the specimen at the set focal point position using the adjusted microscope parameter;
(d) recognizing a shape of an observation object in the acquired digital live image by analyzing the acquired digital live image of the specimen, the observation object being a cell component of the biological tissue, without storing the digital live image in a storage unit as an observation image for quantitative analysis;
(e) generating a composite image in which an outline of the recognized shape of the observation object is superimposed on the observation object in the digital live image so as to highlight a cell structure of the observation object in the digital live image;
(f) displaying the generated composite image on a display, the generated composite image displayed on the display being composed of the digital live image with the outline of the recognized shape of the observation object superimposed on the observation object in the digital live image, without storing the digital live image in a storage unit as an observation image for quantitative analysis, the digital live image constituting the composite image being acquired and displayed in real time with the outline of the recognized shape of the observation object superimposed thereon;
(g) determining whether or not the microscope parameter is appropriate, by referring to the displayed composite image in which the outline of the recognized shape of the observation object is superimposed on the observation object in the digital live image; and
(h) in response to a determination in said (g) determining that the microscope parameter is not appropriate, performing, once again, said (b) adjusting, said (c) acquiring, said (d) recognizing, said (e) generating, said (f) displaying, and said (g) determining;
(i) in response to a determination in said (g) determining that the microscope parameter is appropriate, storing, in a storage unit, the adjusted microscope parameter that has been determined to be appropriate, such that the adjusted microscope parameter is associated with the focal point position; and
(j) in response to a determination in said (g) determining that the microscope parameter is appropriate, storing, in the storage unit, as an observation image for quantitative analysis, the digital live image corresponding to the displayed composite image based on which the determination is made, such that the digital live image stored as the observation image is associated with the focal point position.

2. An observation method comprising:
(a) setting a focal point position relative to a specimen, the specimen being a biological tissue;
(b) adjusting a microscope parameter;
(c) acquiring, based on light intensity detected with a photodetector, a digital live image of the specimen at the set focal point position using the adjusted microscope parameter;
(d) recognizing a shape of an observation object in the acquired digital live image by analyzing the acquired digital live image of the specimen, the observation object being a cell component of the biological tissue, without storing the digital live image in a storage unit as an observation image for quantitative analysis;
(e) generating a composite image in which an outline of the recognized shape of the observation object is superimposed on the observation object in the digital live image so as to highlight a cell structure of the observation object in the digital live image;
(f) displaying the generated composite image on a display, the generated composite image displayed on the display being composed of the digital live image with the outline of the recognized shape of the observation object superimposed on the observation object in the digital live image, without storing the digital live image in a storage unit as an observation image for quantitative analysis, the digital live image constituting the composite image being acquired and displayed in real time with the outline of the recognized shape of the observation object superimposed thereon;
(g) determining whether or not the microscope parameter is appropriate, by referring to the displayed composite image in which the outline of the recognized shape of the observation object is superimposed on the observation object;
(h) in response to a determination in said (g) determining that the microscope parameter is not appropriate, performing, once again, said (b) adjusting, said (c) acquiring, said (d) recognizing, said (e) generating, said (f) displaying, and said (g) determining;
(i) in response to a determination in said (g) determining that the microscope parameter is appropriate, storing, in a storage unit, the adjusted microscope parameter that has been determined to be appropriate, such that the adjusted microscope parameter is associated with the focal point position;
(j) acquiring an observation image for quantitative analysis by use of the adjusted microscope parameter stored in association with the focal point position; and
(k) performing quantitative analysis by referring to the acquired observation image.

* * * * *